Dec. 6, 1966  D. DANIELS  3,289,544
ROTARY ACTUATOR
Filed March 4, 1964  3 Sheets-Sheet 1

INVENTOR.
Dennis Daniels
BY
Hill, Sherman, Meroni, Gross & Simpson
ATTORNEYS

Dec. 6, 1966  D. DANIELS  3,289,544
ROTARY ACTUATOR
Filed March 4, 1964  3 Sheets-Sheet 2

INVENTOR.
Dennis Daniels
BY
Hill, Sherman, Meroni, Gross & Simpson
ATTORNEYS

Dec. 6, 1966  D. DANIELS  3,289,544
ROTARY ACTUATOR

Filed March 4, 1964  3 Sheets-Sheet 3

INVENTOR.
Dennis Daniels
BY
Hill, Sherman, Meroni, Gross & Simpson
ATTORNEYS

United States Patent Office 3,289,544
Patented Dec. 6, 1966

3,289,544
ROTARY ACTUATOR
Dennis Daniels, 122 Berkley Road, Williamsville, N.Y.
Filed Mar. 4, 1964, Ser. No. 349,264
11 Claims. (Cl. 91—167)

This invention relates generally to rotary actuators, and more specifically to a fluid-actuated device which may be employed for positioning a rotatably or angularly movable element about its axis of rotation in any selected one of a predetermined number of angular positions.

Although the principles of the present invention may be included in various devices, a particularly useful application is made in a machine tool wherein one element such as a workpiece is to be successively positioned in numerous angularly related positions.

The present invention contemplates the utilization of a group of tandem connected rotary fluid actuators which may be individually actuated from one limit of travel to the other, and any combination of which rotary fluid actuators may be jointly actuated. The element to be positioned is thus moved by an angular amount which is the angular sum of the travels of the various actuated rotary actuators.

Accordingly, it is an object of the present invention to provide improved fluid-actuated positioning means.

Another object of the present invention is to provide an improved rotary fluid actuator.

Yet another object of the present invention is to provide a mechanism for angularly positioning a rotatable element to any one of a predetermined number of angular positions.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIG. 7 is a fragmentary cross-sectional view taken along line VII—VII of FIG. 1.

As shown on the drawings:

Figure 1:
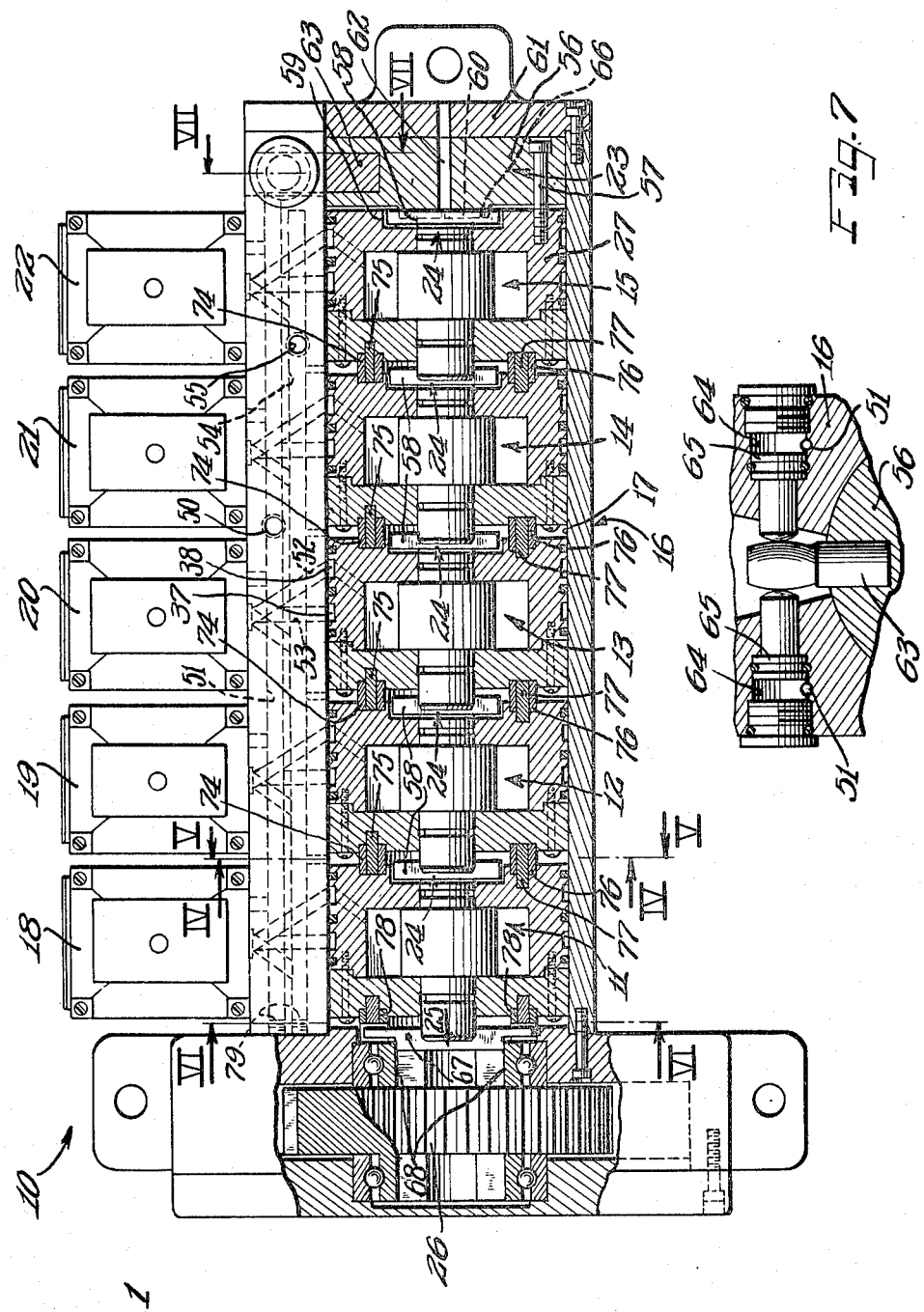
FIG. 1 is a top view, partially shown in cross-section, of a rotary fluid-actuated positioning device provided in accordance with the principles of the present invention, certain details being diagrammatically shown.

The principles of this invention are particularly useful when embodied in a fluid-actuated positioning device such as illustrated in FIG. 1, generally indicated by the numeral 10. The rotary fluid actuator assembly 10 includes a group of rotary fluid actuators 11–15, each of which is identical to the others, and all of which are coaxially aligned. The actuators 11–15 are rotatably supported by a block generally indicated at 16 which has means defining a cylindrical bore 17 that supports the actuators 11–15. The block 16 also supports a group of fluid valves 18–22 of a commercially available type, the valves 18–22 being operative to control individually the actuators 11–15 respectively. Any combination of two or more valves 18–22 may be jointly actuated to obtain joint actuation of the corresponding actuators 11–15. The group of actuators 11–15 has means generally indicated at 23 disposed at one end thereof, the means 23 being normally operative to support such end of the group of actuators against rotation. A rotary drive connection generally indicated at 24 is operative between adjacent pairs of actuators 11–15 to connect the same mechanically together in series so that each is in angular-driving relation to the other actuators in the series. The other end of the group of actuators 11–15 is provided with means generally indicated at 25 which is constructed to be drivably coupled or coupleable to a rotatable element, here illustrated as a gear 26. The gear 26 represents the workpiece or any other rotatable element, the angular position of which is desired to be set.

Figure 2:
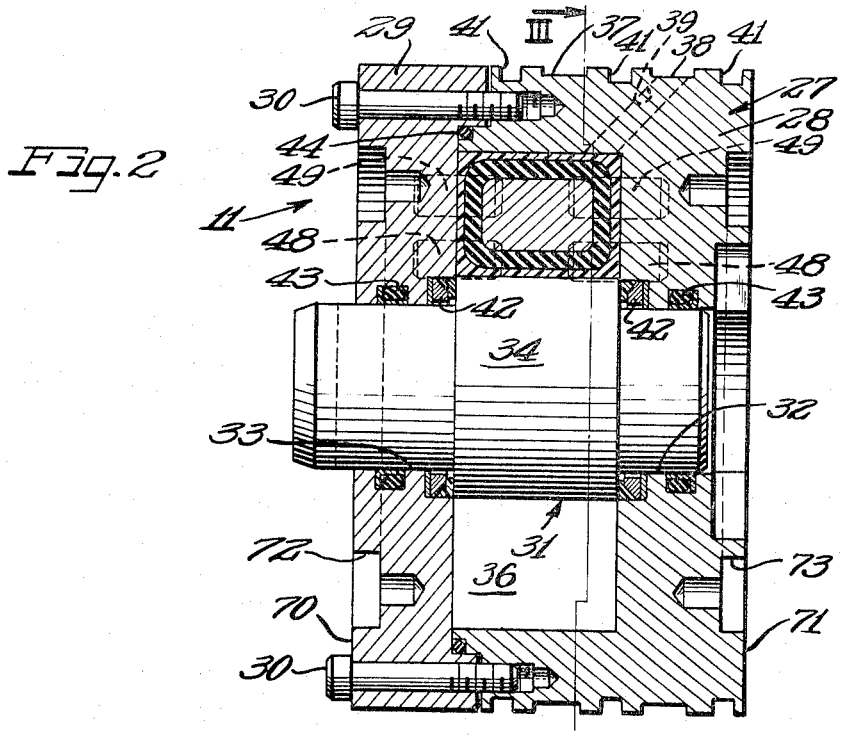
FIG. 2 is an enlarged cross-sectional view of an individual rotary actuator employed in the structure of FIG. 1.
Figure 3:
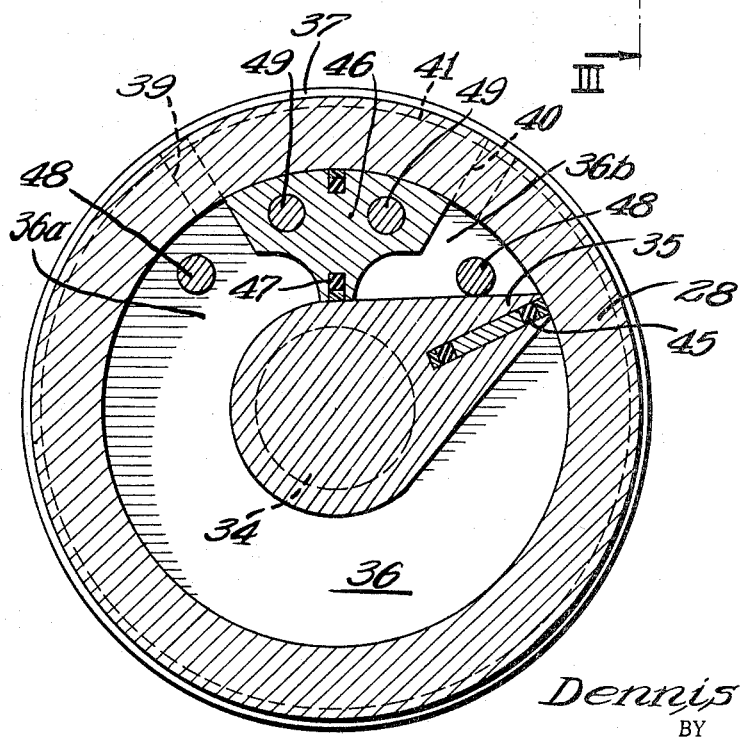
FIG. 3 is an enlarged cross-sectional view taken generally along line III—III of FIG. 2.

The details of each of the identical actuators 11–15 are brought out more clearly in FIG. 2 where, for convenience, the same is designated as the actuator 11. The actuator 11 comprises a rotatable housing 27 which is of cylindrical configuration. The housing 27 includes a body 28 and an end cap 29 secured thereto as by a number of screws 30. The body 28 is hollow, and a rotor or rotor assembly 31 is disposed therein. The housing 27 is provided with an aperture in each of its ends, namely an aperture 32 in the body 28 and an aperture 33 in the cap 29. The rotor assembly 31 includes a shaft 34 rotatably supported at its ends by the housing 27, there being a vane 35 secured thereto and projecting radially therefrom and disposed within a chamber 36 in the housing 27. As best seen in FIG. 3, the vane 35 divides the chamber 36 into two portions, 36a and 36b lying on opposite sides of the vane 35.

On its outer peripheral surface, the housing 27, and in particular, its body 28, is provided with a pair of circumferential grooves 37, 38 which are radially outwardly directed toward the bore 17 of the block 16. The groove 38 communicates through a passage 39 with the chamber portion 36a, and the groove 37 communicates through a passage 40 with the chamber portion 36b. Thus, the grooves 37 and 38 communicate with opposite sides of the vane 35. When a greater fluid pressure is applied from the groove 38 through the passage 39 to the chamber portion 36a, rotor assembly is caused to rotate in a clockwise direction as shown in FIG. 3, to the position shown. This movement forces fluid in the chamber 36b out through the passage 40 to the groove 37. O-ring grooves 41 are disposed at opposite sides of the grooves 37, 38 to receive O-rings which seal them and which seal them from each other. The chamber 36 is otherwise sealed by a pair of shaft seals 42, 42 and shaft seals 43, 43 disposed at opposite ends of the shaft 34. A further packing ring 44 provides a pressure seal between the cap 29 and the body 28.

The vane 35 is provided with a suitable seal 45, and a body extension 46 is provided with a suitable seal 47 which coacts with the seal 45 to prevent leakage between the chamber portions 36a and 36b.

The housing 27 supports a pair of internal stops 48, 48. As a practical matter, the stops 48 may be readily so disposed that the shaft 34 may have a maximum full travel defined by such stops 48 which travel typically is on the order of 280°. The housing body extension 46 is held in place by four pins 49 which may be identical to the internal stop pins 48 which pins 48 limit the maximum full angular travel of the rotor or rotor assembly 31. When the identical actuators 11–15 are assembled as shown in FIG. 1, the rotors or rotor assemblies 31 are coaxially aligned with each other, and the shaft thereof of each actuator projects from corresponding sides. Since the means 23 normally holds the actuator 15 so that its housing cannot rotate, at least the actuators 11–14 are rotatable. However, as explained below, some angular movement of the actuator 15 within the bore 17 is also provided.

The block 16 is considered as being fixed for reference purposes and includes suitable fluid ports and passages which communicate with the bore 17. More specically, there is provided a pressure port 50 which communicates with an internal distribution passage 51 which is connected to each of the valves 18–22. Each of the valves 18–22 communicates with a pair of connecting passages 52, 53 leading to the grooves 37, 38. Depending upon the position of each of the valves 18–22, pressure is applied alternatively to one of the connecting passages 52, 53, while the valve communicates the non-pressurized groove with a branched return passage 54 leading to a return port 55. The branched return passage 54 also communicates with spaces between the actuators 11–15 to drain any leakage fluid which might otherwise collect. The arrangement of the various passages and ports 50–55 is diagrammatic. Thus, each of the valves 18–22 receives pressurized fluid from the distribution passage 51, and then being connected in series with the passages leading to the actuators 11–15, it directs pressure to the appropriate groove 37 or 38, and receives and returns to the return passage 54, the fluid from the low pressure side.

The means 23 includes a cylindrical member 56 rotatably supported in the bore 17. The member 56 is secured to the housing 27 of the actuator 15 for corotation therewith. To this end, a number of screws 57 may be employed. Alternatively, or to augment the screws 57, a key 58 is employed which is received in a slot 59 in the housing 27 and held by suitable projecting ears 60 forming a part of the member 56. If desired, the member 56 as well as an end cap 61 of the block 16 may be provided with a fluid drain opening 62. The means 23 normally supports the actuator 15 against rotation. However, the means 23 is resiliently yieldable to enable movement of the actuator 15 by a slight amount in both angular directions from the predetermined or normal angular position as shown. To this end, the member 56 is provided with a radially projecting arm 63 by which the member 56 is both initially held and returned to such predetermined angular position after there has been slight angular yielding. As best seen in FIG. 7, fluid pressure is brought from the branched distribution line 51 to a pair of cylindrical cavities 64, in each of which there is disposed a piston 65 which is thus fluid-biased to one end of the cylindrical cavity 64. The pistons 65 engage the arm 63 and hold it in such predetermined angular position, or normally fixed position. Although other types of biased members may be employed, it is particularly advantageous to utilize the structure disclosed since the amount of cushioning provided will thereby be matched or automatically compensated for the fluid inlet pressure.

The means 23 may also be termed an inertia compensator.

The means 24 acting between the means 23 and the actuator 15 includes the key 58. Similarly, the means 24 acting between the adjacent pairs of actuators 11–12, 12–13, 13–14, and 14–15 also includes a key 58.

Figure 4:
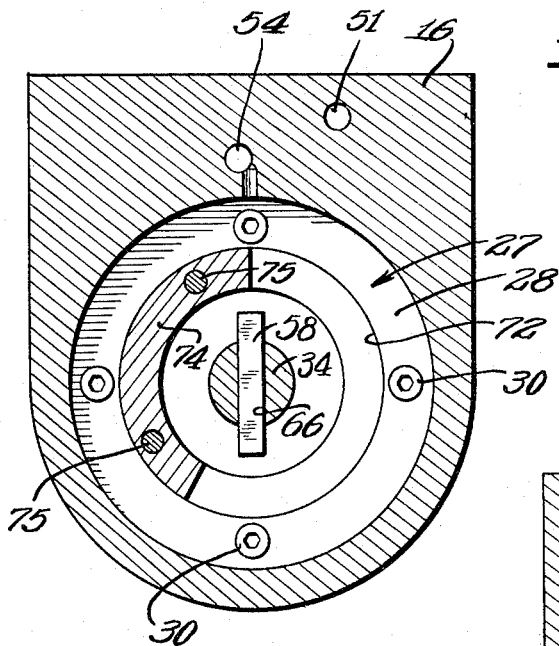
FIGS. 4 and 5 are enlarged cross-sectional views taken along line IV—IV and line V—V respectively of FIG. 1.
Figure 5:
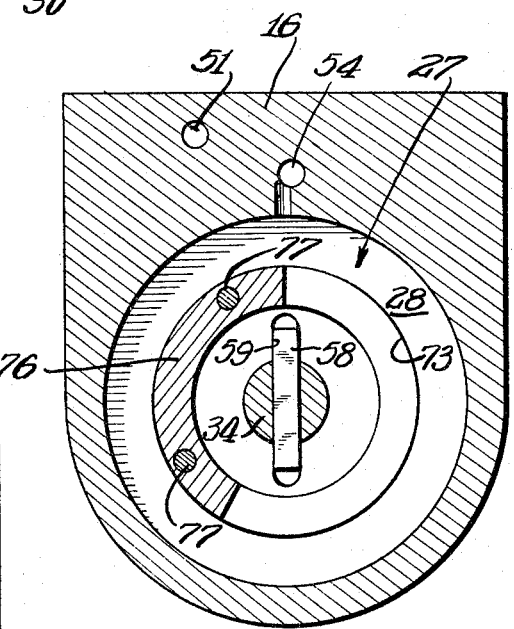

Referring to FIG. 4, the end of each shaft 34 is slotted as at 66 to provide a rotational driving connection between the shaft 34 and the key 58. Similarly, as shown in FIG. 5, the housing 27, or more specifically the body 28 thereof is provided with the slot 59 which receives the key 58, such key being also held by the shaft 34 of the adjacent actuator. Thus, there is a rotary drive connection between the rotors and the adjacent housings, or between the shafts and such adjacent housings. Thus also, the remainder of the housings 27 are keyed to the shaft of the actuator disposed to the right of it in FIG. 1.

The shaft of the actuator 11 is keyed by the means 25 to the rotatable element or drive member 26, and to this end, there is provided a key 67, the central portion of which is received in the slot 66 of the shaft 34, and the next radially outward portion of which is received in a slot 68. The key 67 is somewhat longer than the keys 58, and the purpose and function of the additional length thereof is explained below. Thus, the actuator 11 is constructed to be drivably coupled or coupleable to the rotatable element 26 which is keyed to the shaft of such actuator 11.

Assuming that each of the actuators 11–15 has a full travel of 280°, a zero position may be defined by having all of the chambers 36a pressurized. When any one actuator is energized, or actuated, it moves to its opposite extreme position, thereby imparting an angular movement of 280° to the rotatable element 26. If a structure were provided which includes only the actuators 11 and 15, connected together, such structure could provide three predetermined positions uniformly spaced over a range of 566° of movement of the rotatable element 26. By further gearing, this amount of movement may be increased or decreased. By using three actuators 11–15, a range of 840° is provided, there being four possible positions. The use of four actuators provides five positions evenly divided over a range of 1120°. The embodiment disclosed in FIG. 1 thus can provide six positions uniformly spread over a range of 1400°.

However, the greatest versatility of this device is provided when additional means are included, described below, by which travel of the identical actuators 11–15 is made non-identical. More specifically, it is preferred that the full angular travels of the various actuators be a plurality of different integral multiples of the smallest of such full angular travels. A few examples will emphasize this point. Assuming that a device has two of the actuators 11–15, then either one would have a full travel of 280° and the other would be restricted to have a travel of 140°. With this arrangement, four instead of three different positions are provided over an angular range of 420°, such positions being spaced apart by increments of 140°, namely 0°, 140°, 280° and 420°. If three actuators 11–15 were provided having respectively angular travels of 70°, 140°, and 280°, eight positions are provided over a range of 490° in 70° increments. If four actuators 11–15 are provided, and are provided with angular full travels of 35°, 70°, 140° and 280°, a total of sixteen different positions are obtainable spread over a range of 525° in 35° increments. In the disclosed embodiment, it is contemplated that angular travels of 30°, 60°, 120°, 240° and 240° be provided, such structure providing twenty-four uniformly spaced positions in 30° increments spread over a range of 690°.

The invention thus further includes detachable interfitting means on adjacent pairs of actuators or actuator housings to define a full angle of travel which is less than the maximum possible full angle of travel. Such structure is here provided between adjacent housings, and serves to limit positively the full angle of travel to a predetermined angle, such as one of the angles mentioned in the examples above. When the angles are so selected that the full angle of travel of each actuator 12–15 is a plurality of different integral multiples of the full angular travel of the actuator 11, a structure is provided wherein the angular sum of all the travels may be stated as being $n$ degrees, the full angular travels individually and jointly comprising all the integral multiples of the smallest full angular travel in the range from zero to $n$ degrees. By way of example, in the illustrated embodiment, the ratios of such travels are respectively 1 to 2 to 4 to 8 to 8. To achieve this result, there are provided second stop means which are removably secured to the various housings externally thereof to limit the full angular travel of the rotor assembly to a selected angle smaller than the maximum full angular travel which is otherwise possible.

Referring to FIG. 2, each of the axially directed faces 70, 71 of each of the actuators 11–15 is provided with a circular groove 72, 73 which is concentric with the rotational axis. The groove 72 is shown in elevation in FIG. 4, while the groove 73 is shown in elevation in FIG. 5.

Within the groove 72, there is disposed and secured an arcuate stop means 74, the same being held by a pair of pins 75, 75. Similarly, in the groove 73, there is disposed and secured an arcuate stop means 76 which is retained therein by a pair of pins 77, 77. Each of the stop means 74 and 76 projects from its groove 72, 73 respectively. The grooves 72 and 73 exactly confront each other, and the projecting stop means 74 extends into an otherwise unoccupied portion of the groove 73, and similarly, the projecting stop means 76 extends into an otherwise unoccupied portion of the groove 72. When the housings 27, 27 are moved relatively to each other in one angular direction, the ends of the stop means 74, 76 abut each other. When the relative movement is in the opposite angular direction, the opposite ends of the stop means 74, 76 abut each other. The unoccupied portion of the grooves 72, 73 thus constitutes a freedom of angular motion which defines the limits of full travel which one of the associated pair of actuators may have. Thus, to provide a 60° full travel, each of the stop means 74, 76 is provided an angular length of 150°. The illustration of these elements in FIG. 1 is made with the various housings so shifted that the view is taken through both the stop means 74 and the stop means 76.

Figure 6:
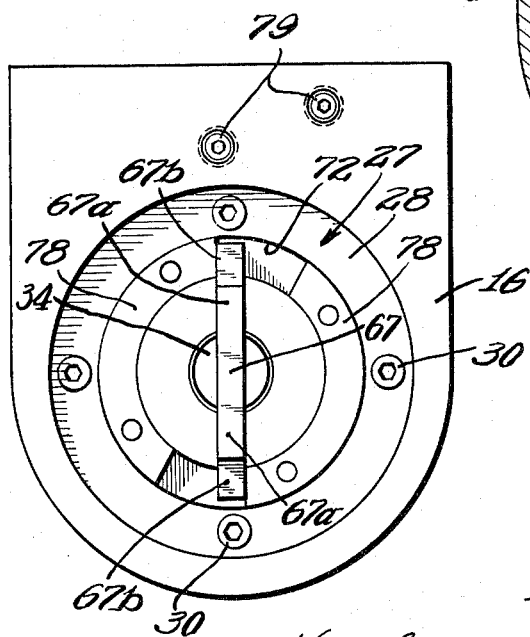
FIG. 6 is an enlarged elevational view taken generally along the line VI—VI of FIG. 1.

Another form of providing such stop means is illustrated in FIG. 6, employed as a part of the means 25 for connecting the actuator 11 to the rotatable element 26. In this structure, both of a pair of stop means 78, 78 are disposed in the groove 72 in a fixed position, and both of the stop means 78 project therefrom. It will be recalled that the central portion of the key 67 has an angular driving connection with the shaft 34, and that portions indicated in FIG. 6 at 67a have a similar driving relation with the rotatable element 26 by being received in the grooves 68. The key 67 however projects radially as indicated at 67b, the radially projecting ends thereof being disposed between confronting ends of the stop means 78, 78. In this structure, the gap between the ends of the stop means 78, 78, minus the angular thickness of the key end 67b defines the angular full travel of the actuator 11.

As best seen in FIGS. 1 and 6, the ends of the passages 51 and 54 are closed by plugs 79, wherever required.

By selective use of stop means 74, 76, and 78 of the appropriate angular extent or length, it is possible to provide the user with a wide selection of total angular travel, of the total number of angular positions obtainable, and of the size of angular increment. If desired, the angular increment may be made non-uniform to suit special cases, the number of actuators 11–15 may be either lowered or increased, and additional groups of actuators may be connected in series to that shown. The net angular output of the actuators 11–15 may be directed through step-up or step-down gearing to further vary the usefulness of a particular rotary fluid actuator assembly 10.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A mechanism for angularly positioning a rotatable element, comprising:
   (a) a group of individually actuatable rotary fluid actuators whose combined angular travel exceeds 360°, said actuators comprising a series of separate hollow housings and a corresponding number of rotors respectively disposed therein;
   (b) a block having means defining a continuous cylindrical bore of uniform diameter receiving and rotatably supporting said hollow actuator housings;
   (c) rotary drive connections between actuator rotors and adjacent hollow actuator housings, by which connections said rotary actuators are connected together in series;
   (d) one end of said group having means by which said one end is normally supported against rotation; and
   (e) the other end of said group having means by which said group is drivingly coupleable to the rotatable element.

2. A mechanism for angularly positioning a rotatable element, comprising:
   (a) a group of individually actuatable rotary fluid actuators, each of said actuators comprising
       (1) a cylindrical housing having a pair of circumferential grooves on the outer surface thereof, and an internal chamber, and
       (2) a vane-type of rotor rotatably supported by said housing in said chamber, said grooves having fluid communication through said housing with opposite sides of said vane-type of rotor;
   (b) a block having means defining a continuous cylindrical bore receiving and rotatably supporting said actuator housings, said block having
       (1) a fluid pressure port leading to an internal distribution passage, and internal return passage leading to a fluid return port and a number of drain passages connecting said continuous cylindrical bore to said internal return passage between adjacent pairs of said cylindrical housings,
       (2) a valve for each actuator connected to said distribution passage to receive fluid therefrom, and to said return passage, and
       (3) a pair of connecting passages alternatively connecting said circumferential grooves under control of said valve to said distribution and return passages;
   (c) rotary drive connections between actuator rotors and adjacent actuator housing, by which connections said rotary actuators are connected together in series;
   (d) one end of said group having means by which said one end is normally supported against rotation; and
   (e) the other end of said group having means by which said group is drivingly coupleable to the rotatable element.

3. A rotary fluid actuator assembly, comprising:
   (a) a plurality of housings, at least all but one of which are rotatable about a common axis;
   (b) a plurality of vane-type rotors respectively coaxially rotatably supported in said housings, any one or more of said rotors being selectively individually or jointly fluidly reciprocable;
   (c) means connecting said housings and rotors together in mechanical series; and
   (d) interfitting means on adjacent housings operative to define the full angle of travel between said adjacent housings.

4. A rotary fluid actuator assembly, comprising:
   (a) a plurality of housings, at least all but one of which are rotatable about a common axis;
   (b) a plurality of vane-type rotors respectively coaxially rotatably supported in said housings, any one or more of said rotors being selectively individually or jointly fluidly reciprocable;
   (c) means connecting said housings and rotors together in mechanical series; and
   (d) interfitting means on said housings operative positively to limit the full angular travels of the associated rotors to a plurality of different integral multiples of the smallest of said full angular travels.

5. A rotary fluid actuator assembly, comprising:
   (a) a plurality of housings, at least all but one of which are rotatable about a common axis;
   (b) a plurality of vane-type rotors respectively coaxially rotatably supported in said housings, any one or more of said rotors being selectively individually or jointly fluidly reciprocable;

(c) means connecting said housings and rotor together in mechanical series; and (d) interfitting means on adjacent housings operative to define the full angle of travel between said adjacent housings, the angular sum of which full angular travels is $n$ degrees and which full angular travels individually and jointly comprise all integral multiples of said smallest full angular travel lying in the range between zero and $n$ degrees.

6. A mechanism for angularly positioning a rotatable element, comprising:

(a) a group of identical individually actuatable coaxially aligned rotary fluid actuators, each of said actuators comprising
   (1) a rotatable cylindrical housing, and
   (2) a vane-type of rotor rotatably supported therein;

(b) means connecting said housings and rotors together in angular-driving mechanical series;

(c) detachable interfitting means on adjacent pairs of actuators operative to limit the full angular travel of one such actuator to a predetermined angle; and (d) means by which one end of said group of rotary actuators may be drivingly coupled to said element to effect incremental rotations thereof.

7. A mechanism for angularly positioning a rotatable element, comprising:

(a) a group of individually actuatable rotary fluid actuators, each of said actuators comprising
   (1) a rotatable cylindrical housing,
   (2) a rotor assembly, each rotor assembly including a vane secured to a shaft and disposed within said housing, and said shaft being rotatably supported by said housing and projecting from one side thereof,
   (3) first stop means supported by said housing for engagement by said vane, and when engaged disposed to limit the maximum full angular travel of the rotor assembly, and
   (4) second stop means removably secured to said housing externally thereof, and operative to limit the full angular travel of the rotor assembly to a selected angle smaller than said maximum full angular travel;

(b) rotary drive connections between the projecting shafts and the housings of the adjacent actuators;

(c) one end of said group having means by which said one end is normally supported against rotation; and (d) the other end of said group having means by which said group is drivingly coupleable to the rotatable element.

8. A mechanism for angularly positioning a rotatable element, comprising:

(a) a group of individually actuatable rotary fluid actuators, each of said actuators comprising a housing and a rotor disposed therein;

(b) rotary drive connections between actuator rotors and adjacent actuator housings, by which connections said rotary actuators are connected together in series;

(c) one end of said group having means normally supporting said one end against rotation, said means being resiliently yieldable in both angular directions; and (d) the other end of said group having means by which said group is drivingly coupleable to the rotatable element.

9. A mechanism for angularly positioning a rotatable element, comprising:

(a) a group of individually actuatable rotary fluid actuators, each of said actuators comprising a housing and a rotor disposed therein;

(b) a rotary drive connections between actuator rotors and adjacent actuator housings, by which connections said rotary actuators are connected together in series;

(c) means acting on one end of said group and normally holding said one end in a predetermined angular position, said means being yieldable in either angular direction and operative after yielding to return said one end to said predetermined angular position; and (d) the other end of said group having means by which said group is drivingly coupleable to the rotatable element.

10. A mechanism for angularly positioning a rotatable element, comprising:

(a) a group of individually actuatable rotary fluid actuators, each of said actuators comprising a housing and a rotor disposed therein;

(b) rotary drive connections between actuator rotors and adjacent actuator housings, by which connections said rotary actuators are connected together in series;

(c) an arm projecting radially from one end of said group in a predetermined angular position;

(d) a pair of biased members acting on opposite sides of said arm and jointly normally supporting said arm against angular movement from said position, each of asid members being individually yieldable in an angular direction against its bias and operative to return said arm to said predetermined position; and (e) the other end of said group having means by which said group is drivingly coupleable to the rotatable element.

11. A mechanism according to claim 10 in which said biased members comprise fluid-biased pistons.

References Cited by the Examiner
UNITED STATES PATENTS

| | | | |
|---|---|---|---|
| 691,692 | 1/1902 | Zweigbergk | 91—167 |
| 2,911,956 | 11/1959 | Smith | 91—167 |
| 2,969,042 | 1/1961 | Litz et al. | 91—167 |
| 2,988,057 | 6/1961 | Litz | 92—121 |

MARTIN P. SCHWADRON, *Primary Examiner.*

SAMUEL LEVINE, *Examiner.*

P. E. MASLOUSKY, *Assistant Examiner.*

UNITED STATES PATENT OFFICE
CERTIFICATE OF CORRECTION

Patent No. 3,289,544　　　　　　　　　　　　　　December 6, 1966

Dennis Daniels

It is hereby certified that error appears in the above numbered patent requiring correction and that the said Letters Patent should read as corrected below.

In the heading to the printed specification, line 3, for "Dennis Daniels, 122 Berkley Road, Williamsville, N. Y." read -- Dennis Daniels, Williamsville, N. Y., assignor to Houdaille Industries, Inc., Buffalo, N. Y., a corporation of Michigan --

Signed and sealed this 7th day of November 1967.

(SEAL)
Attest:

Edward M. Fletcher, Jr.　　　　　　　　　　EDWARD J. BRENNER
Attesting Officer　　　　　　　　　　　　　Commissioner of Patents